US009773010B1

(12) United States Patent
Ganesh et al.

(10) Patent No.: US 9,773,010 B1
(45) Date of Patent: Sep. 26, 2017

(54) INFORMATION-DRIVEN FILE SYSTEM NAVIGATION

(71) Applicant: Veritas Technologies LLC, Mountain View, CA (US)

(72) Inventors: Anantharaman Ganesh, San Jose, CA (US); Michael Andrew Hart, Brooklyn, NY (US)

(73) Assignee: Veritas Technologies LLC, Mountain View, CA (US)

( * ) Notice: Subject to any disclaimer, the term of this patent is extended or adjusted under 35 U.S.C. 154(b) by 48 days.

(21) Appl. No.: 14/135,441

(22) Filed: Dec. 19, 2013

Related U.S. Application Data

(60) Provisional application No. 61/858,056, filed on Jul. 24, 2013.

(51) Int. Cl.
 *G06F 17/30* (2006.01)
(52) U.S. Cl.
 CPC .............................. *G06F 17/30115* (2013.01)
(58) Field of Classification Search
 CPC ......... G06F 17/30067; G06F 17/30097; G06F 17/30115; G06F 17/30129; G06F 17/30144; G06F 11/1435; G06F 11/00; G06F 17/30091; G06F 17/3014; H04L 29/08072; H04L 29/08099; H04L 29/08144
 USPC ....... 707/812, 821, 822, 823, 824, 825, 826, 707/827, 688, 727; 709/224, 226
 See application file for complete search history.

(56) References Cited

U.S. PATENT DOCUMENTS

| | | | | |
|---|---|---|---|---|
| 5,237,682 A | * | 8/1993 | Bendert | G06F 17/30091 |
| 5,963,914 A | * | 10/1999 | Skinner | G06F 11/34 705/7.15 |
| 7,526,521 B2 | * | 4/2009 | Clark | G06F 17/30592 709/203 |
| 8,584,022 B1 | * | 11/2013 | O'Shaughnessy | G06F 3/04817 707/821 |
| 2002/0052947 A1 | * | 5/2002 | Duimovich | H04L 41/5016 709/224 |
| 2008/0097801 A1 | * | 4/2008 | MacLellan | G06F 11/3409 709/224 |
| 2010/0146015 A1 | * | 6/2010 | Milic-Frayling | G06F 17/30115 707/812 |
| 2011/0153687 A1 | * | 6/2011 | Bacher | G06F 17/30221 707/812 |
| 2011/0264716 A1 | * | 10/2011 | Kuwahara | G06F 3/0605 707/827 |

(Continued)

OTHER PUBLICATIONS

Schroeder et al., Analysis of HPSS Performance Based on Per-File Transfer Logs, Mass Storage Systems, 1999. 16th IEEE Symposium on, Year:1999, pp. 103-115, DOI: 10.1109/MASS.1999.830000.*

*Primary Examiner* — Greta Robinson
(74) *Attorney, Agent, or Firm* — Wilmer Cutler Pickering Hale and Dorr LLP

(57) ABSTRACT

A counter module may identify a number of files operations that have accessed files of a network file system. A folder comprising a first file associated with a file operation may be identified. A file activity count for the folder may be incremented based on the file operation to the first file located in the folder. A second folder that comprises the first folder may also be identified. A file activity count for the second folder may also be incremented in response to the incrementing of the file activity count for the first folder.

23 Claims, 8 Drawing Sheets

(56) References Cited

U.S. PATENT DOCUMENTS

| | | | | |
|---|---|---|---|---|
| 2012/0290565 A1* | 11/2012 | Wana | .................. | G06F 17/3089 707/723 |
| 2012/0311140 A1* | 12/2012 | Kuroda | .................. | H04L 67/22 709/224 |
| 2013/0110565 A1* | 5/2013 | Means, Jr. | ........... | G06Q 10/063 705/7.11 |

* cited by examiner

INFORMATION-DRIVEN FILE SYSTEM NAVIGATION

RELATED APPLICATIONS

This patent application claims the benefit under 35 U.S.C. §119(e) of U.S. Provisional Application No. 61/858,056 filed Jul. 24, 2013, which is herein incorporated by reference.

TECHNICAL FIELD

The present disclosure relates to file system navigation, and more particularly, information-driven file system navigation.

BACKGROUND

A network file system may store a large number of files organized throughout many folders or directories of a file system hierarchy. Users of the network file system may navigate the file system hierarchy to access the stored files. For example, a user of an engineering group of a corporate enterprise may navigate the file system hierarchy by selecting or opening engineering related folders to access an engineering related file. A user of a marketing group may navigate the file system hierarchy by selecting or opening other folders, such as marketing related folders, to access marketing related files that are stored at a different location than the engineering related files.

A network administrator may be responsible to manage and oversee the network file system. Such responsibilities may include remediating access to files stored in the network file system by archiving certain files. The network administrator may also navigate throughout the folders or directories of the file system hierarchy. However, the network administrator typically does not use the network file system in a similar manner as the users in an engineering group or the users in a marketing group. Thus, the network administrator may not be familiar with the file access patterns of the users of the network file system or the organization of the file system hierarchy of the network file system.

BRIEF DESCRIPTION OF THE DRAWINGS

The present disclosure will be understood more fully from the detailed description given below and from the accompanying drawings of various implementations of the disclosure.

SUMMARY

Figure 1:
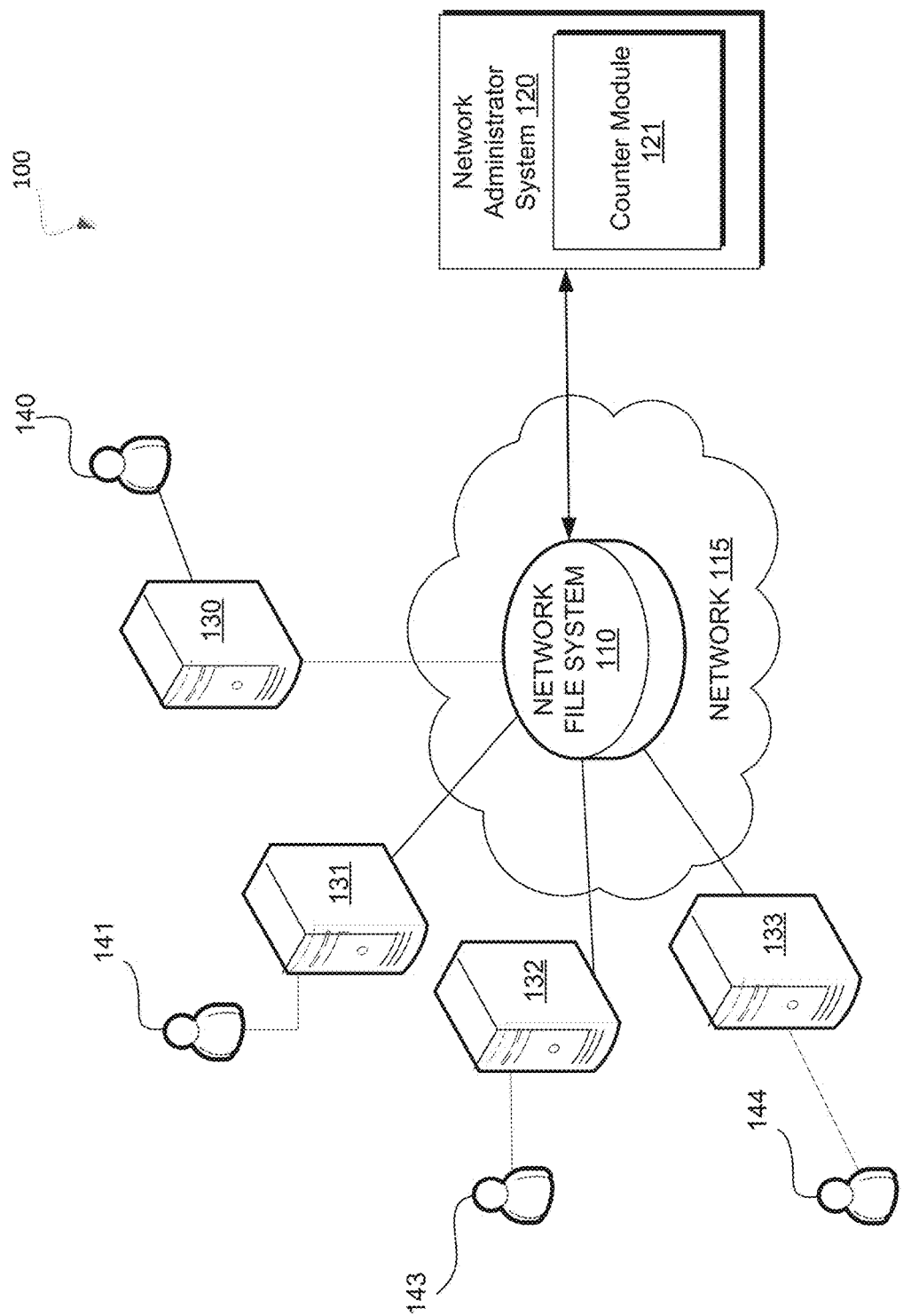
FIG. 1 illustrates an example system architecture in accordance with various implementations.

Information associated with a plurality of file operations may be received. A first folder comprising a file associated with a first file operation of the plurality of file operations may be identified. A first file activity count associated with the first folder may be incremented based on the first file operation. A second folder comprising the first folder may be identified. Furthermore, a second file activity count associated with the second folder may be incremented in response to the incrementing of the first file activity count.

In some embodiments, an activity percentage for the first folder may be calculated based on the first file activity count and the second file activity count and an activity percentage for the third folder based on the third file activity count and the second file activity count.

In some embodiments, the activity percentage for the first folder is based on the first file activity count and the second file activity count such that a value of the first file activity count is divided by a value of the second file activity count.

In some embodiments, the second folder is a root folder and the second file activity count is incremented for each file operation.

In some embodiments a user attribute may be received and the first file operation is associated with a user that matches the user attribute.

In some embodiments, a third folder comprising a second file associated with a second file operation of the plurality of file operations may be identified. The first folder may include the third folder. A third file activity count associated with the third folder may be incremented based on the second file operation. The first and second file activity counts may be incremented in response to the incrementing of the third file activity count.

DETAILED DESCRIPTION

Described herein are a method and apparatus for an information-driven file system navigation. File system navigation may involve users of a network file system selecting various folders or directories to access files stored under one or more of the folders in the network file system. For example, in order to access a particular file a user may select a first folder that includes multiple sub-folders. The user may then select one of the sub-folders that contains the file that the user is intending to access. The navigation of the user through the first folder and the sub-folders may be assisted by file activity count and user attribute count aggregation.

Aggregation of file activity counts may be based on users accessing files of the network file system. For example, a file activity count may be assigned to each folder of the file system hierarchy of the network file system. As users access files organized under or located in a first folder, the file activity count for the first folder may be updated. Furthermore, the file activity count of a parent and ancestral folder (i.e., a folder in a higher hierarchical position) with respect to the first folder may also be updated. For example, a second folder may include the first folder and may be considered a parent folder with respect to the first folder and a third folder may include the second folder and may be considered an ancestral folder with respect to the first folder (and a parent folder to the second folder). The file activity count of the second folder and the file activity count of the third folder may also be updated in response to the updating of the file activity count of the first folder. For example, the file activity count of the first folder may be added to the file activity counts of the second and third folders. As such, file activity counts of various folders may be aggregated at parent and ancestral folders.

Similarly, user attribute counts may also be aggregated at parent and ancestral folders. In some embodiments, a user attribute count may be assigned to each folder or file of the file system hierarchy of the network file system. The user attribute count may indicate a number corresponding to user attributes of users who are associated with the folder or file. For example, the user attribute count may indicate a number of accesses of a file from a user that matches a particular user attribute. An example of a user attribute may be a corporate group or department (e.g., engineering). Each time a user who is associated with an engineering group user attribute accesses a file under a folder, the user attribute corresponding to the engineering group that is assigned to the folder may be incremented. Furthermore, if the folder is included under a parent folder, the engineering group user attribute assigned to the parent folder may also be incremented. As such, as with the file activity counts, user attribute counts may also be assigned to each folder and file of the network file system.

A network administrator, IT administrator, storage administrator, security administrator, or any other professional responsible to manage the network file system may utilize the file activity counts and user attribute counts to more efficiently analyze the network file system. For example, the display of the file activity counts and user attribute counts while a network administrator is navigating the file system hierarchy of the network file system may assist the network administrator to better understand how users access files on the network file system and to identify files or folders that may be inactive and may thus be archived. Accordingly, the disclosure herein provides an analysis of folders and files stored on a network file system to provide analytical data for a network administrator responsible for managing the network file system.

Implementations of the present disclosure may include a counter module, which is described in further detail below, to identify the accesses of the files and to create and aggregate the file activity counts and user attribute counts for folders. The features of the counter module, which are described in further detail below, may include a file identifier sub-module, file operation data sub-module, a count updater sub-module, a folder identifier sub-module, a navigation sub-module, and a calculator sub-module.

FIG. 1 illustrates an example system architecture 100 for various implementations. The system architecture 100 may include one or more computing devices 130, 131, 132, and/or 133, one or more network file systems 110, and one or more network administrator systems 120 coupled to each other via a network 115. The network 115 may be a public network, a private network, a wireless network, a cellular network, or a combination thereof.

A network file system 110 may be a type of data or file storage service that provides file storage and file access services to users 140, 141, 142, and/or 143 of computing devices 130, 131, 132, and/or 133. A computing device may be a desktop computer, laptop computer, or a portable computing device such as, but not limited to, mobile telephones, personal digital assistants (PDAs), portable media players, netbooks, tablet computers, portable gaming consoles, portable televisions, electronic book readers, and the like. As shown, one or more users may use the computing devices 130, 131, 132, and/or 133 to remotely access the network file system 110.

The network file system 110 may allow users 140, 141, 142, and/or 143 of the computing devices to access one or more files stored in association with the network file system 110. In some embodiments, the network file system 110 may be a file storage server or network file storage device associated with a large number of stored files that may be remotely accessed by the computing devices. The files stored in the network file system 110 may be organized under a hierarchy of folders (also referred to as directories). A root folder may be considered the first or top-most folder of the file system hierarchy. Files and additional folders (i.e., sub-folders) may be organized under or located in the root folder. Furthermore, additional files and folders may be organized under sub-folders. The users 140, 141, 142, and/or 143 of the computing devices may access files at various folders through different levels of the file system hierarchy of the network file system 110.

The network file system 110 may be associated with and/or store files of a corporate enterprise. Employees of the corporate enterprise may be users of the network file system 110. For example, employees in an engineering department may access engineering related files under engineering folders and employees in a marketing department may access marketing related files under marketing folders. The system architecture 100 may include one or more network administrator systems 120 to provide a counter module 121 to provide information to assist in the administration of the file system hierarchy of the network file system 110 by identifying and aggregating a frequency of access and user attributes corresponding to the accesses of files stored under various folders. For example, a file activity count and a user activity count for a folder may be calculated by aggregating, by the counter module 121, file activity counts and user activity counts for sub-folders and files under the folder.

As such, the counter module 121 may receive a log file that includes information identifying each instance of a file being accessed in which manner on a network file system as well as the user accessing the file. The counter module 121 may identify a folder that each of the accessed files is stored under in the file system hierarchy and update file activity counts and user attribute counts for each folder based on the accessing of the files. In some embodiments, the counter module 121 may further display the aggregated file activity count and user attribute count information to assist in the navigation of the file system hierarchy of the network file system, as is discussed in further detail below.

Figure 2:
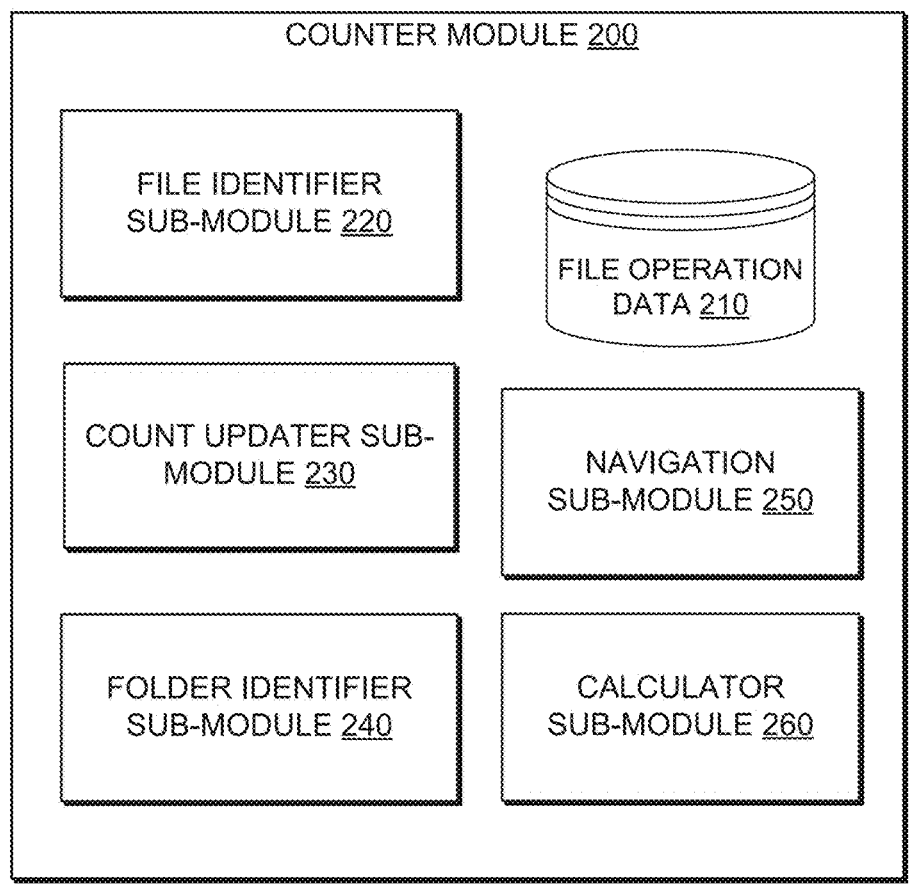
FIG. 2 is a block diagram of an example of a counter module in accordance with some embodiments.

FIG. 2 is a block diagram of a counter module 200 in accordance with some embodiments. In general, the counter module 200 may correspond to the counter module 121 in a network administrator system 120 as shown in FIG. 1. The counter module 200 may include a file operation data sub-module 210, file identifier sub-module 220, count updater sub-module 230, folder identifier sub-module 240, navigation sub-module 250, and a calculator sub-module 260. In alternative embodiments, the functionality of one or more of the sub-modules may be combined or divided.

As shown in FIG. 2, the counter module 200 may include a file operation data sub-module 210. In some embodiments, the file operation data sub-module 210 may record or receive information associated with users accessing files stored in the network file system. For example, the file operation data sub-module 210 may receive or record a stream of file operations (e.g., accesses) and create a log file or update a log file based on the file operations. In some embodiments, the log file may include an entry for each instance of a file on the network file system being accessed by a user. The entry may identify the user who has accessed the file, the file that was accessed, the location of the file that was accessed (e.g., the containing folder), and/or the time when the file was accessed. The file operation data sub-module 210 may be a persistent storage unit. In some embodiments, a persistent storage unit may be a local storage unit or a remote storage unit. Persistent storage units may be a magnetic storage unit, optical storage unit, solid state storage unit, electronic storage units (main memory), or similar storage unit. Persistent storage units may be a monolithic device or a distributed set of devices. A 'set', as used herein, refers to any positive whole number of items. In some embodiments, the file operation data sub-module 210 also includes information identifying user attributes of users who have accessed the files on the network file system. Examples of user attributes include, but are not limited to, a business unit affiliation (e.g., engineering department, marketing department, etc.), job title, office location, etc. In the same or alternative embodiments, the file operation data sub-module 210 may include information identifying file attributes of files that have been accessed or stored on the network file system. Examples of file attributes include, but are not limited to, file size, number of users accessing the files, an identification if the file is a sensitive file (e.g., a file with credit card information, medical records, etc.), a data loss prevention (DLP) policy associated with a file, etc.

The counter module 200 may include a file identifier sub-module 220. In some embodiments, the file identifier sub-module 220 may receive the file operation data (e.g., a log file) from the file operation data sub-module 210 and identify files that have been accessed by a user, the number of accesses for each of the files, and/or user attributes of the users who have accessed each of the files. For example, the identifier sub-module 220 may process each entry in the file operation data to identify each instance of a file being accessed by a user and determine a number of times that each file has been accessed.

As shown, the counter module 200 may include a folder identifier sub-module 240. In some embodiments, the folder identifier sub-module 240 may identify folders in which the accessed files are located as well as any parent and ancestral folders associated with the folder in which the accessed files are located. For example, the folder identifier sub-module 240 may identify a first folder in which a first file is located. The folder identifier sub-module 240 may then also identify if the first folder is located within a second folder (e.g., the first folder is a sub-folder or child folder of another folder). Such a relationship between the first folder and the second folder may be a parent-child relationship (e.g., the first folder is a child folder and the second folder is a parent folder). In some embodiments, after identifying that the first folder is located within the second folder, the folder identifier sub-module 240 may identify if the second folder is located within a third folder. Such a third folder may be referred to as an ancestral folder with respect to the first folder (and a parent folder of the second folder). If the folder identifier sub-module 240 does identify the third folder, then the folder identifier sub-module 240 may continue to identify additional ancestral folders until the root folder of the network file system is identified as an ancestral folder. In some embodiments, the identification of a parent and any ancestral folder associated with a folder containing an accessed file may be performed for each accessed file that has been identified by the file identifier sub-module 220. Further details with regard to a file system hierarchy and folders are disclosed with relation to FIG. 4.

As shown in FIG. 2, the counter module 200 may include a count updater sub-module 230. In some embodiments, the count updater sub-module 230 may receive the identification information of the accessed files and users associated with the accessed files from the identifier sub-module 220 and the identified folder information from the folder identifier sub-module 240 and assign and/or update a file activity count and one or more user attribute counts for folders of the network file system. In some embodiments, each folder of the network file system may be associated with a file activity count that identifies a number of accesses of files that are located within each folder as well as the number of accesses of files that are located within sub-folders. For example, a first folder may include a first file and a second file. The first file may have been accessed three times by users of the network file system and the second file may have been accessed two times by the users of the network file system. In response to the accessing of the first and second files, the file activity count of the first folder may be updated based on the five total accesses of the first and second files. For example, a file activity count of the first folder may be incremented by a value of five. Furthermore, a parent folder of the first file may also be updated in response to the accessing of the first and second file. For example, the file activity count of the parent folder of the first folder may also be incremented by a value of five. Furthermore, the file activity count of an ancestral folder to the first folder may also be incremented by the value of five. In some embodiments, the parent folder may include a second folder that includes a third file that has been accessed seven times. In response to the third file having been accessed seven times, the file activity counts of the second folder, parent folder, and the ancestral folder to the first and second folder may be incremented by an additional seven times. For example, since the first folder contains files that have been accessed a total of five times and the second folder contains files that have been accessed a total of seven times, the file activity count of the parent folder to the first folder and the second folder and any ancestral folder to the first and second folders may be incremented by 12 to aggregate the file accesses of any files under any parent or ancestral folder.

User attribute counts may be similarly incremented. For example, in the above example with a parent folder including a first folder and a second folder, if users with a first user attribute have accessed three files under the first folder and seven files under the second folder, a first user attribute count of the first folder may be incremented by three, a first user attribute count of the second folder may be incremented by seven, and the first user attribute count for the parent folder may be incremented ten times. Further details with regard to updating file activity counts and user attribute counts of folders are disclosed with relation to FIGS. 3, 5A, and 5B.

Returning to FIG. 2, the counter module 200 may include a calculator sub-module 260. In some embodiments, the calculator sub-module 260 may receive the file activity count information from the file activity count updater sub-module 230 and calculate a file activity percentage for folders based on the file activity counts of the folders. For example, for each folder or file, a percentage of file activity that occurred in a folder or with a file may be calculated with respect to the overall file network system. To calculate such a percentage for each folder or file, the file activity count for the folder or file may be divided by the file activity count for the root folder of the network file system. In the same or alternative embodiments, a file activity count percentage for a folder or file may be calculated by dividing the file activity count for the folder or file by the file activity count for the parent folder of the folder or file. For example, if a parent folder has a first child folder and a second child folder, then the activity count for the first child folder may be divided by the activity count of the parent folder and the activity count for the second child folder may be divided by the activity count of the parent folder. Such a percentage may correspond to a percentage of file activity counts for the first folder with respect to sibling folders or files (e.g., the second folder at the same hierarchical level).

The counter module 200 may include a navigation sub-module 250. In some embodiments, the navigation sub-module 250 may display the updated or incremented file activity counts and updated or incremented user attribute counts from the count updater sub-module 230 and one or more of the percentages from the calculator sub-module 260. For example, the file activity count, file activity count percentage, and one or more user attribute counts of folders and files may be displayed while a user is navigating the file system hierarchy of the network file system. Further details with regard to displaying the file activity count percentage while navigating the file system hierarchy are disclosed with relation to FIG. 6.

As such, the counter module 200 may identify file operations associated with the accessing of files. A number of accesses of each file may be identified and assigned as the file activity count for a file. Furthermore, a number of accesses of all files under each folder may be identified. The presence of parent and ancestral folders for each folder may also be determined. The file activity counts for a folder may be updated to aggregate the file activity count for each file under the folder as well as for any file located in a child folder. File activity count percentages may then be calculated and displayed while a user is navigating a file system hierarchy. Moreover, user attribute counts may be assigned to each folder based on users who have accessed files organized under each folder. Such user attribute count information may also be displayed while a user is navigating a file system hierarchy.

Figure 3:
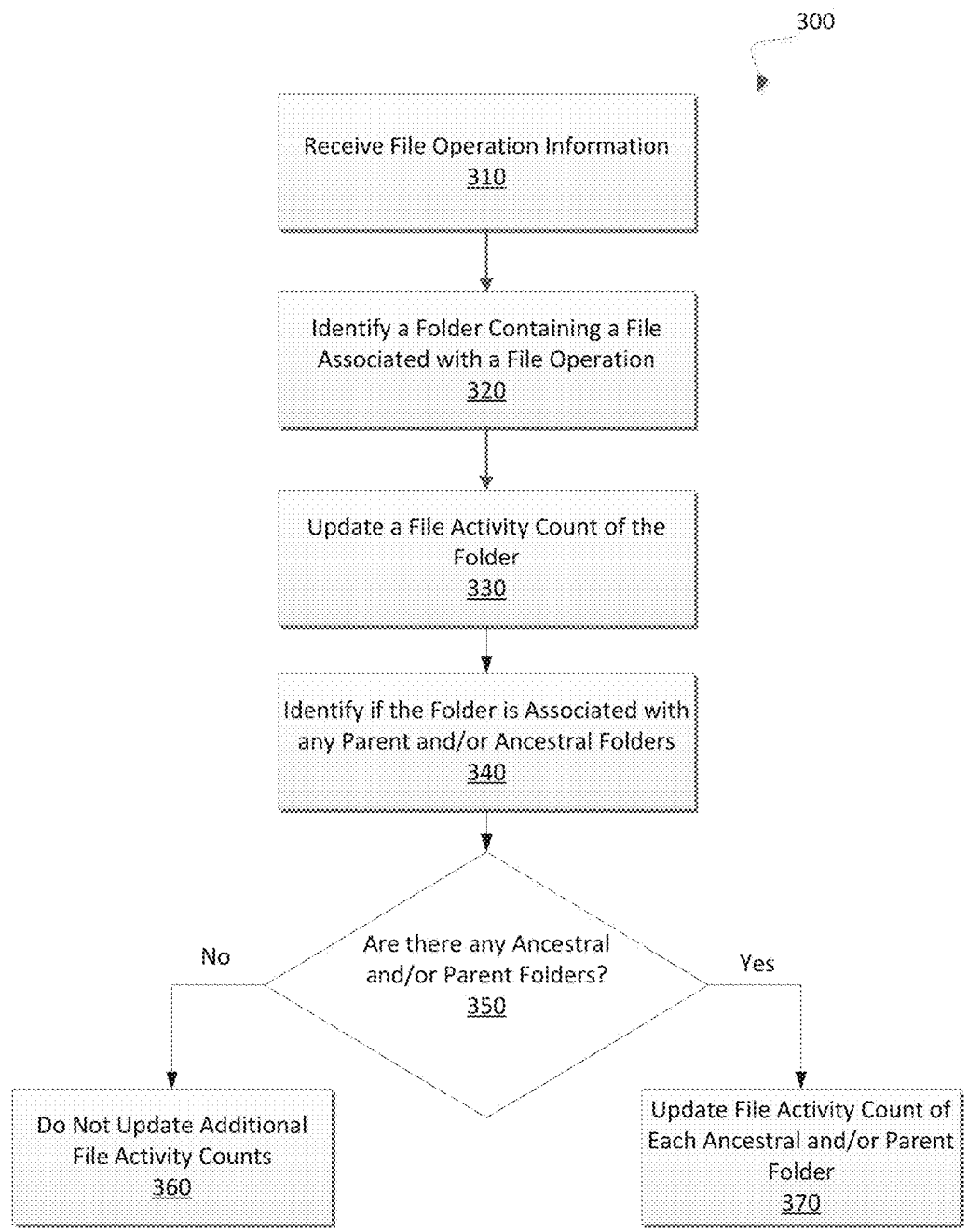
FIG. 3 is a flow diagram illustrating an example method to aggregate file activity counts in accordance with some embodiments of the present disclosure.

FIG. 3 is a flow diagram illustrating an example method 300 to aggregate file activity counts. The method 300 may be performed by processing logic that may comprise hardware (e.g., a processing device, circuitry, dedicated logic, programmable logic, microcode, etc.), software (e.g., instructions run on a processing device), or a combination thereof. In some embodiments, the method 300 may be performed by a counter module 121 or 200 in a network administrator system 120 of FIG. 1.

As shown in FIG. 3, the method 300 may begin by the processing logic receiving file operation information (block 310). For example, the processing logic may identify a stream of file operations or retrieve a log file identifying each instance of a file being accessed. In some embodiments, the receiving of the file operation information may be performed in response to a user selection to navigate to a portion (e.g., particular folder) of a network file system. The processing logic may identify a folder containing a file associated with a file operation (block 320) and may further update a file activity count of the folder (block 330). For example, the file activity count of the folder may be incremented by the number of times that the file has been accessed by any user of the network file system. The processing logic may further identify if the folder is associated with any parent and ancestral folders (block 340). If the processing logic does determine that there is an ancestral folder and/or a parent folder (at block 350), then the file activity count of each ancestral folder and the parent folder may be updated based on the number of times that the file has been accessed by any user of the network file system (block 370). For example, the file activity count for the ancestral folders and parent folder may be incremented by an amount equal to the number of times that the file has been accessed. However, if there are no identified ancestral and/or parent folders, then the processing logic may not update any additional file activity counts (block 360).

The method 300 may be repeated for each file that has been accessed by a user. For example, the file activity count for ancestral and/or parent folders may be incremented in response to multiple file operations for multiple files located in sub-folders. As such, file activity counts of folders may be based on an aggregation of file activity counts of files and folders under a folder. The file activity count of a parent folder may be based on the file activity count of each of the child folders and any files located immediately under the parent folder.

Figure 4:
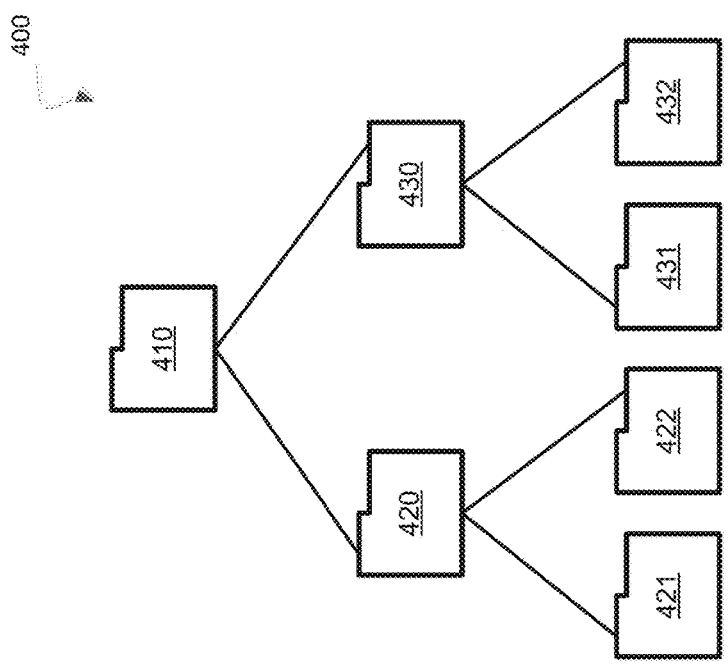
FIG. 4 is an illustration of an example file system hierarchy in accordance with some embodiments.

FIG. 4 an illustration of an example file system hierarchy 400 in accordance with some embodiments. In general, the file system hierarchy 400 may represent an organization of folders storing files in a network file system (e.g., network file system 110). The file system hierarchy 400 may be identified by the network administration system 120, counter module 121 or 200, and/or the folder identifier sub-module 240 of FIGS. 1 and 2. In some embodiments, the file system hierarchy 400 may be identified at block 340 of FIG. 3.

As shown in FIG. 4, the file system hierarchy 400 may include a hierarchy of folders arranged in multiple levels. For example, at a first level, the file system hierarchy 400 may include a folder 410 that is referred to as a root folder. In some embodiments, the root folder is the first folder in the file system hierarchy and thus does not have a parent folder. For example, the root folder may correspond to the entire network file system of a corporate enterprise with various separate file servers, file shares, folders, and files of the corporate enterprise organized under the root folder. The file system hierarchy 400 may include a second level of folders 420 and 430. In some embodiments, the root folder 410 may be considered a parent folder to the folders 420 and 430 as the folders 420 and 430 are located within the root folder 410. Furthermore, the file system hierarchy 400 may include a third level of folders 421, 422, 431, and 432. The folders 421 and 422 may be located within the folder 420 and the folders 431 and 432 may be located within the folder 430. In such an example, the folder 420 may be considered a parent folder to the folders 421 and 422 and the folder 430 may be considered a parent folder to the folders 431 and 432. Furthermore, the folder 410 may be considered an ancestral folder to each of the folders 421, 422, 431, and 432 as it is a parent folder to the folders 420 and 430.

As previously described, the file activity counts for folders may be aggregated. For example, the file activity count for the folder 420 may be updated or incremented in response to the file activity counts for the folders 421 and 422. For example, the file activity count for the parent folder 420 may calculated by adding the file activity count for each file that is immediately stored under the folder 420 and the file activity counts for each of the folders 421 and 422. Furthermore, the aggregated file activity count of the folder 420 may also be used to increment the file activity count of the root folder 410. As such, the updating of the file activity counts may continue upwards in the file system hierarchy 400 until the root folder is reached. Accordingly, the file activity count of the root folder 410 may be based on adding the file activity count for any file immediately located under the root folder 410 and the file activity counts for the folders 420, 421, 422, 430, 431, and 432.

In some embodiments, folders located within the same parent folder may be referred to as sibling folders. For example, folders 420 and 430 may be referred to as sibling folders as the folder 410 is the parent folder for each of the folders 420 and 430. Furthermore, folders 421 and 422 may be referred to as sibling folders and folders 431 and 432 may be referred to as sibling folders.

In some embodiments, the aggregation of the file activity counts and user attribute counts may be performed for various levels of the file system hierarchy as the user is at a first level of the file system hierarchy. For example, the file activity counts and user attribute counts may be calculated for multiple hierarchical levels when a user enters a root folder (e.g. folder 410) such that the file activity counts and user attribute counts are initially calculated for the root directory as well as hierarchical levels beneath the root directory (e.g., the second and third level of folders). For example, in response to a user navigating to the root folder 410, file activity counts and user attribute counts may be pre-calculated for folders and files organized under folders 420 and 430 at the second level and under the folders 421, 422, 431, and 432 at the third level of the file system hierarchy. As such, file activity counts and user attribute counts for various levels of the file system hierarchy may be pre-computed before a user has navigated to each of the levels of the file system hierarchy. Although the above description refers to pre-computing at the root folder, the pre-computing may be performed at any or multiple hierarchical levels of the network file system. For example, pre-computing may be performed at any parent folder for any number of folders at any hierarchical level below the parent folder.

Figure 5A:
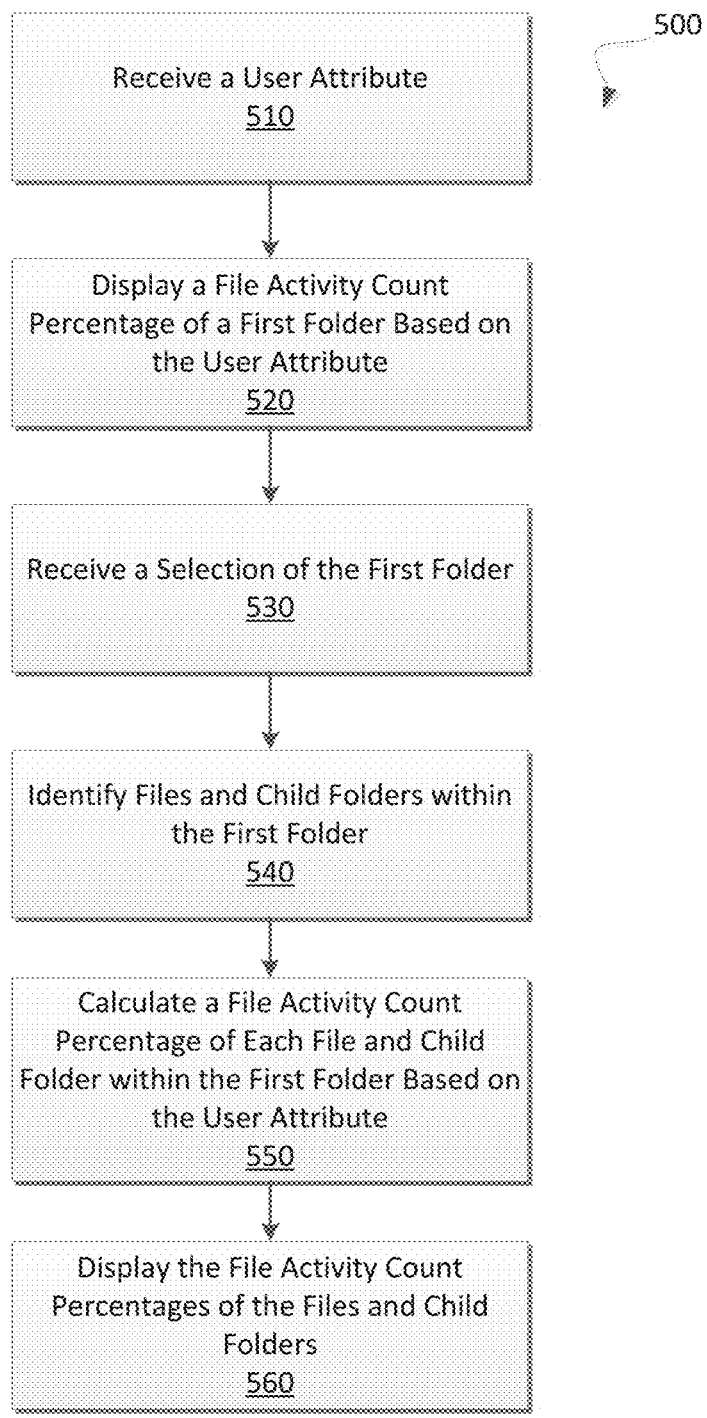
FIG. 5A is an example method to provide file activity count information to assist file system navigation in accordance with some embodiments of the present disclosure.

FIG. 5A is an example method 500 to provide file activity count information to assist file system navigation. The method 500 may be performed by processing logic that may comprise hardware (e.g., a processing device, circuitry, dedicated logic, programmable logic, microcode, etc.), software (e.g., instructions run on a processing device), or a combination thereof. In some embodiments, a counter module 121 or 200 may perform the method 500 in a network administrator system 120 of FIG. 1.

As shown in FIG. 5A, the method 500 may begin by the processing logic receiving an indication of a user attribute (block 510). For example, the processing logic may receive a user attribute identifying a specific user (e.g., a user name) or a user attribute that may be associated with multiple users (e.g., a job title, business organization, location, etc.). The processing logic may display one or more folders and/or files and a file activity count percentage of folders and files based on the user attribute (block 520). For example, a file activity count may be calculated for file operations from users that match the user attribute. As such, the updating of a file activity count as described with relation to method 300 may be used for file operations from users matching the user attribute. Thus, file activity counts for folders may be calculated for accesses of files from users who match the user attribute and a file activity count percentage relative to the user attribute may be calculated for the files and folders as previously described. The processing logic may receive a selection of a first folder (block 530) and identify files and child folders located within the first folder (block 540). In response to the user selecting the first folder and the identification of the files and child folders within the first folder, the processing logic may calculate a file activity count percentage for each file and child folder within the first folder. In some embodiments, the percentage may be based on the file activity count of the first folder. For example, the first folder may have a file activity count of 100 corresponding to 100 file accesses from users who match the user attribute. A first child folder may have a file activity count of 20, a second child folder may have a file activity count of 50, and a file located in the first folder may have a file activity count of 30. As such, the file activity count percentages of the first child folder, second child folder, and the file may be calculated relative to the file activity count of the first folder. For example, each file activity count for the first and second child folder and the file may be divided by the file activity count of the first folder (e.g., 100). As such, the file activity count percentage of the first folder may be 20%, the file activity count percentage of the second folder may be 50%, and the file activity count percentage of the file may be 30%. The processing logic may further display the file activity count percentages of files and child folders located under the first folder (block 560). Further details with regard to displaying the file activity count percentages are disclosed with relation to FIG. 6.

As such, a user attribute may be received. Folders and files and corresponding file activity count percentages of the folders and files based on the user attribute may be displayed. A user may select one of the displayed folders to navigate to a portion of the network file system organized under the selected folder. In response to the user selection, folders and files under the selected folder may be displayed. Furthermore, a file activity count percentage of the files and folders under the selected folder may be calculated based on the file activity count of the selected folder.

Figure 5B:
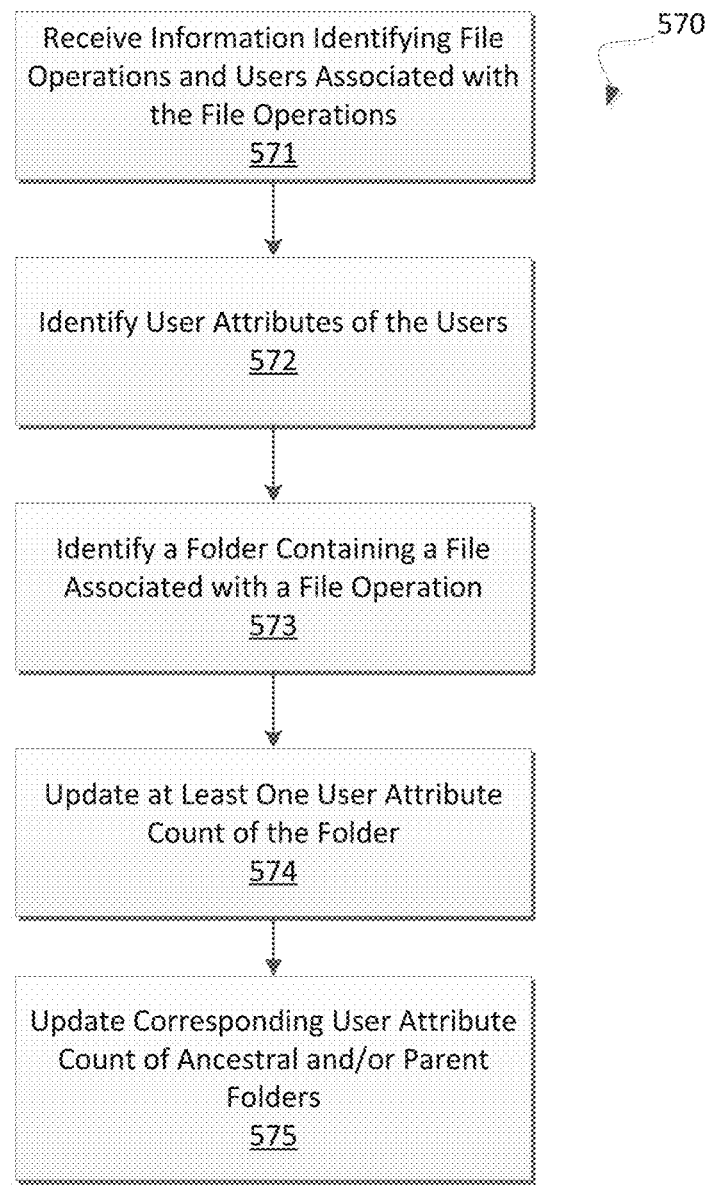
FIG. 5B is an example method to aggregate user attribute counts in accordance with some embodiments.

FIG. 5B is an example method 570 to provide user attribute count information to assist file system navigation. The method 570 may be performed by processing logic that may comprise hardware (e.g., a processing device, circuitry, dedicated logic, programmable logic, microcode, etc.), software (e.g., instructions run on a processing device), or a combination thereof. In some embodiments, a counter module 121 or 200 may perform the method 570 in a network administrator system 120 of FIG. 1.

As shown in FIG. 5B, the method 570 may begin by the processing logic receiving information identifying file operations and users associated with the file operations (block 571). For example, the processing logic may identify each user associated with each instance of a file being accessed. The processing logic may identify user attributes associated with each of the identified users (block 572). For example, each user may be associated with multiple user attributes and corresponding values for the user attributes. Examples of user attributes include, but are not limited to, corporate department or group, location, job title, citizenship, etc. Furthermore, the processing logic may identify a folder containing a file accessed by at least one of the users (block 573) and may further update one or more user attribute counts of the folder in response to the user accessing the file (block 574). The corresponding user attribute counts of any ancestral and/or parent folders may also be incremented or updated in response to the updating of the user attribute count of the folder (block 575).

Figure 6:
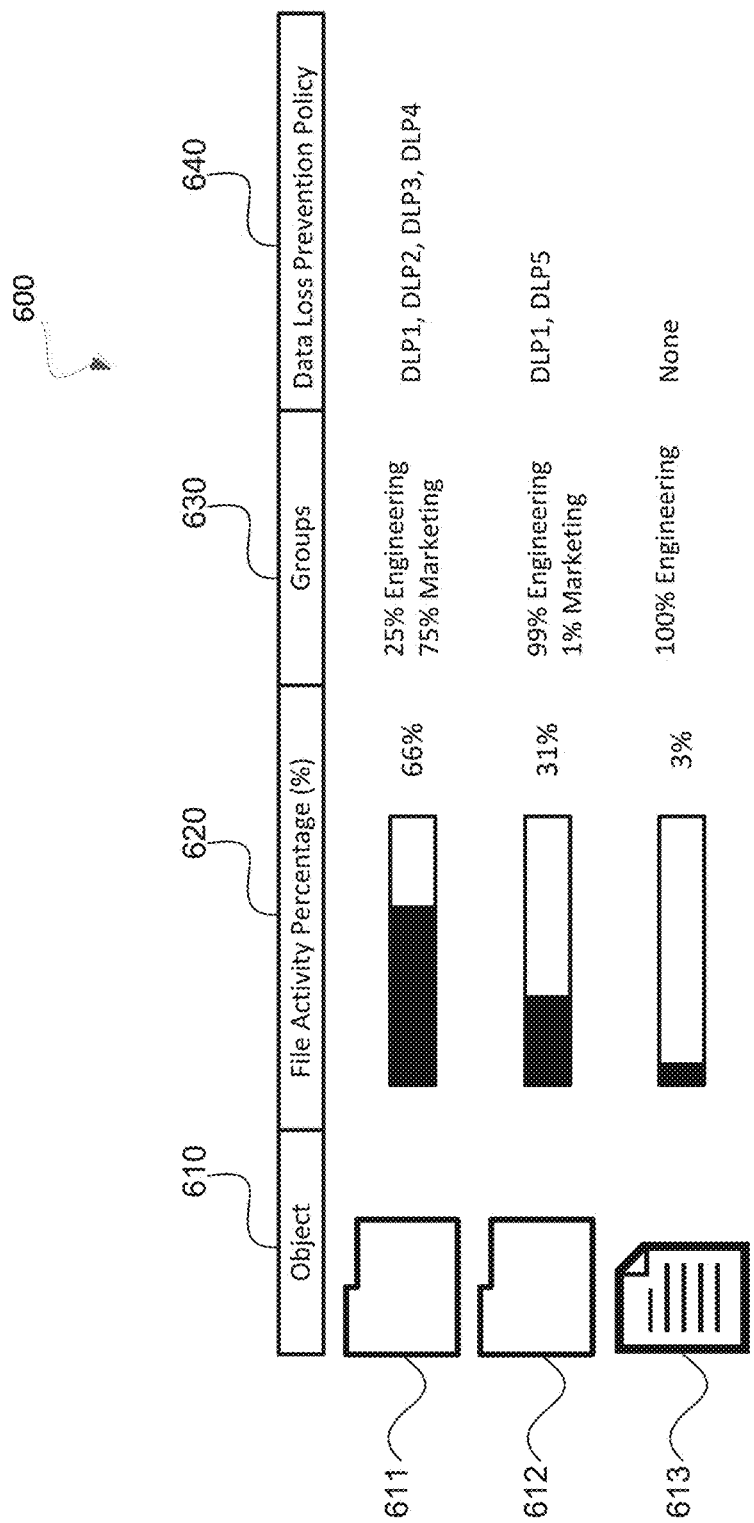
FIG. 6 illustrates an example graphical user interface to display file activity count aggregation information during file system navigation in accordance with some embodiments of the present disclosure.

As an example, a first user attribute count and second user attribute count may correspond to different corporate groups of users (i.e., different attribute values). Examples of corporate groups may include, but are not limited to, an engineering group and a marketing group. As such, the first user attribute count may correspond to the 'engineering group' user attribute value and the second user attribute count may correspond to the 'marketing group' user attribute value. Furthermore, a third user attribute count and a fourth user attribute count may correspond to different locations of users. For example, the third user attribute count may correspond to a location user attribute value of 'California' and the fourth user attribute count may correspond to a location user attribute value of 'New York.' As an example, a first user with user attribute values of 'engineering group' and 'California' may have accessed the file under the identified folder. In response to the accessing of the file by the first user, the first user attribute count ('engineering group') and the third user attribute count ('California') of the folder may be incremented. Furthermore, first and third user attribute counts of each ancestral and/or parent folder may also be incremented. FIG. 6 illustrates an example graphical user interface 600 to display file activity count and user attribute count information during file system navigation. In general, the graphical user interface 600 may be displayed by the counter module 121, 200, and/or the navigation sub-module 250.

As shown in FIG. 6, the graphical user interface 600 may display a level of a file system hierarchy of a network file system. For example, the graphical user interface 600 may display objects (e.g., folders and files) under an objects column 610 and file activity count percentages of the objects under the file activity count percentage column 620. The objects column 610 may identify folders 611 and 612 and a file 613 and the file activity count percentage column 620 may display corresponding file activity count percentages for the folders 611 and 612 and the file 613. In some embodiments, a user may select one of the folders 611 or 612 (e.g., as described with relation to block 530) and new folders or files located under the selected folder may be displayed along with calculated file activity count percentages.

In some embodiments, the file activity count percentage column 620 may display an indicator bar for each of the folders or files under the objects column 610. As shown, the indicator bar may be represented as a bar chart where the bar chart is more filled or longer if the file activity count percentage is high as opposed to when the file activity count percentage is low. Although the file activity count percentage column 620 illustrates a bar chart to display the file activity count percentages, any other graphical or symbolic representation capable of showing a relative difference between values of the file activity count percentage may be used.

In the same or alternative embodiments, the file activity count percentage column 620 may display the file activity count percentage based on a range of colors. For example, a higher file activity count percentage may result in the folder and/or file activity count percentage bar being displayed as a first color while a lower file activity count percentage may result in the file activity percentage bar being displayed as a second color. In some embodiments, the file activity count percentage may correspond to temperature and a large amount of file activity may correspond to a high temperature and a low amount of file activity may correspond to a low temperature. As an example, a high file activity count percentage may be associated with a red color and a low file activity count percentage may be associated with a blue color. Such a red and blue color scheme may correspond to a heat map where red is associated with the higher temperature (and a high file activity percentage) and blue is associated with a lower temperature (and a low file activity percentage).

The visual representations used to illustrate relative differences between the values of the file activity count percentages of the folders and files under the object column 610 may also be applied to the entries of the object column 610. For example, relative differences between the values of the file activity count percentages may be visually represented within the object column 610. In such an example, fonts used in the object column 610 or a background color for each object in the object column 610 may be based on the file activity count percentage of the corresponding folder or file. For example, a first folder in the object column 610 may be associated with a high file activity count percentage and a second folder in the object column 610 may be associated with a low file activity count percentage. To visually represent the differences between the file activity count percentages of the first and second folders, the first folder may be included with a first color (e.g., red) background and the second folder may be included with a second color (e.g., blue) background. In the same or alternative embodiments, the first folder may be included with the first color background and a more bolded or larger text to list the first folder name and the second folder may be included with the second color background and a less bolded or smaller text to list the second folder name. As such, the object column 610 may be used to identify folders and files as well as to visually represent differences between file activity count percentages of the folders and files. Thus, the file activity count percentage column 620 may not be necessary in such an embodiment as the representation of the differences of the file activity count percentages are included in the object column 610. Although an example of blue and red is described, one skilled in the art will recognize that any combination of colors may be used to display the file activity percentages of the graphical user interface 600.

Returning to FIG. 6, the graphical user interface 600 may further display user attribute count information during file system navigation. For example, a column 630 may display user attribute count information associated to a corporate group or department associated with the objects listed under the object column 610. As an example, the folders 611 and 612 may contain child folders and/or files with user attribute counts associated with the 'engineering group' and 'marketing group.' Such user attribute count information may be used to determine the types of users (e.g., the type of corporate group) that are active (e.g., accessing files) under the folders 611 and 612 or active in accessing the file 613. Although the column 630 corresponds to a user attribute count information corresponding to corporate groups, any other type of user attribute count information may be displayed in the graphical user interface 600. For example, a number of active users, number of corporate departments, etc. may be displayed.

Furthermore, file attribute information may be shown. In some embodiments, file attribute information may correspond to an aggregation of information associated with files stored under all hierarchical levels under a folder. Examples of such aggregated file attribute information include, but are not limited to, a number of files contained under each folder, a number of active files, a number of sensitive files, a number of folders, etc. may be displayed in the graphical user interface 600. Thus, a file attribute of a folder corresponding to file sizes may aggregate the size of all files stored under the folder at all hierarchical levels. As an example, the graphical user interface 600 may include a column 640 to identify any data loss prevention (DLP) policies that have been assigned to any folder or file under the folders 611 and 612 or assigned to the file 613. Thus, the column 640 may identify all of a particular type of file attribute (e.g., DLP policy) that have been assigned to any folder or file under the folders 611 and 612. In some embodiments, the graphical user interface 600 may be sorted based on any information displayed in one of the columns. For example, the order of the objects under the object column 610 may be ordered based on number of active users, number of corporate departments, an active size, number of files, etc. As such, the organization of the graphical user interface 600 may be based on a descending or ascending order of a file activity count, file activity count percentage, user attribute count, or a file attribute count.

Figure 7:
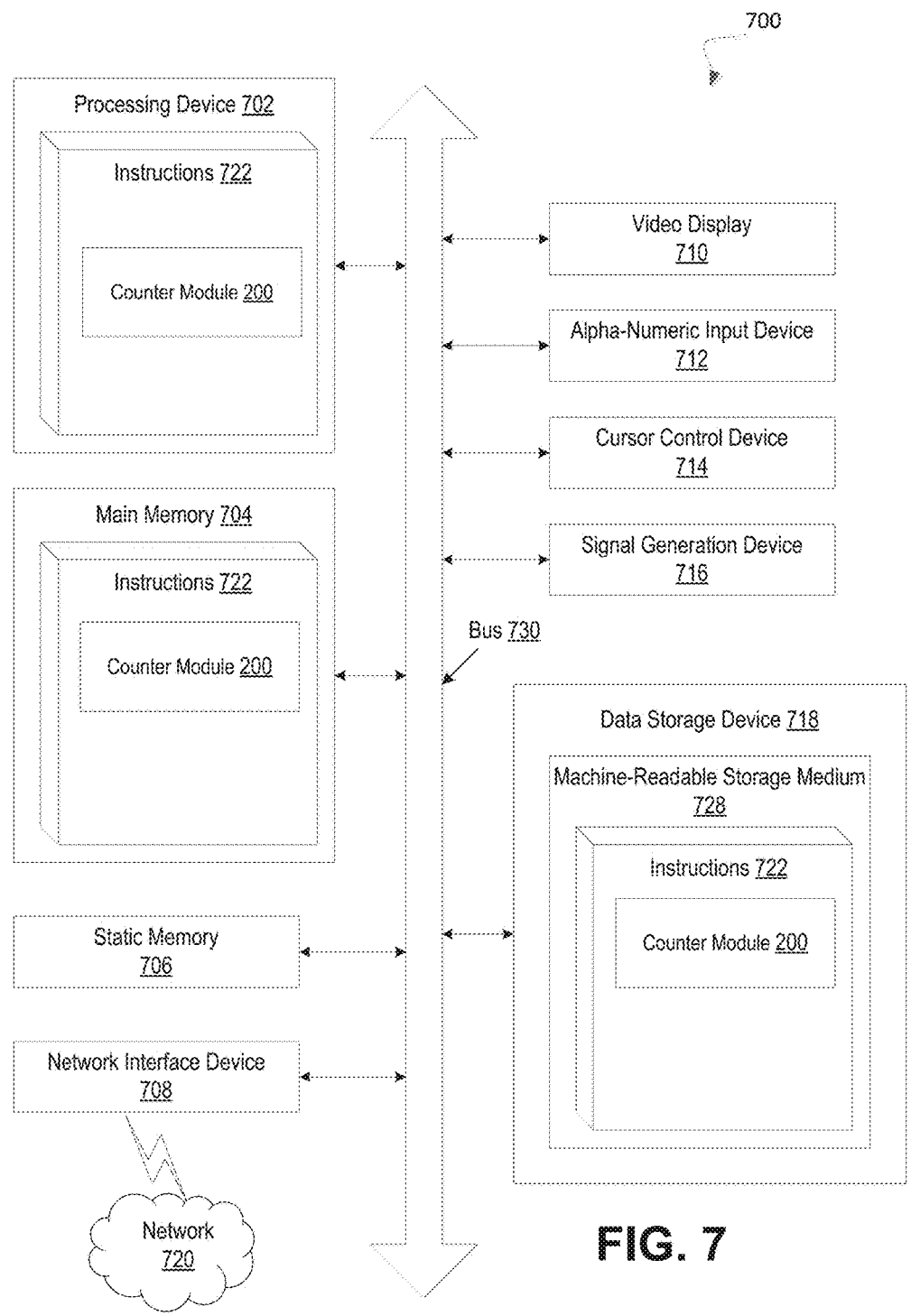
FIG. 7 is a block diagram of an example computer system that may perform one or more of the operations described herein.

FIG. 7 illustrates an example machine of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 702 is configured to execute instructions 722 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-readable storage medium 728 (also known as a computer-readable medium) on which is stored one or more sets of instructions or software 722 embodying any one or more of the methodologies or functions described herein. The instructions 722 may also reside, completely or at least partially, within the main memory 704 and/or within the processing device 702 during execution thereof by the computer system 700, the main memory 704 and the processing device 702 also constituting machine-readable storage media.

In one implementation, the instructions 722 include instructions for a counter module (e.g., counter module 121 of FIG. 1 and/or counter module 200 of FIG. 2) and/or a software library containing methods that call modules or sub-modules in a counter module. While the machine-readable storage medium 728 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
   receiving, at at least one processing device, information associated with a plurality of file operations;
   identifying, by the at least one processing device, a first folder comprising a file associated with a first file operation of the plurality of file operations;
   incrementing, by the at least one processing device, a first file activity count associated with the first folder based on the first file operation, wherein the first file activity count represents a number of times that files in the first folder and in subfolders of the first folder have been accessed;
   incrementing, by the at least one processing device, a first user attribute count associated with the first folder based on the first file operation, wherein the first user attribute count represents a number of times that files in the first folder and in subfolders of the first folder have been accessed by a user that matches a particular user attribute;
   identifying, by the at least one processing device, a second folder comprising the first folder; and
   incrementing, by the at least one processing device, a second file activity count associated with the second folder in response to the incrementing of the first file activity count, wherein the second file activity count represents a number of times that files in the second folder and in subfolders of the second folder have been accessed.

2. The method of claim 1, further comprising:
   identifying a third folder comprising a second file associated with a second file operation of the plurality of file operations, the second folder further comprises the third folder;
   incrementing a third file activity count associated with the third folder based on the second file operation; and
   incrementing the second file activity count in response to the incrementing of the third file activity count.

3. The method of claim 2, further comprising:
   calculating an activity percentage for the first folder based on the first file activity count and the second file activity count and an activity percentage for the third folder based on the third file activity count and the second file activity count.

4. The method of claim 3, wherein the activity percentage for the first folder is based on the first file activity count and the second file activity count such that a value of the first file activity count is divided by a value of the second file activity count.

5. The method of claim 3, further comprising:
   displaying the activity percentage for at least the first folder.

6. The method of claim 1, wherein the second folder is a root folder, and wherein the second file activity count is incremented for each of the plurality of file operations.

7. The method of claim 1, further comprising:
   receiving the particular user attribute, wherein the first file operation is associated with the user that matches the particular user attribute.

8. The method of claim 1, further comprising:
   identifying a third folder comprising a second file associated with a second file operation of the plurality of file operations, the first folder comprises the third folder;
   incrementing a third file activity count associated with the third folder based on the second file operation; and
   incrementing the first and second file activity counts in response to the incrementing of the third file activity count.

9. A system comprising:
   a memory; and
   a processing device coupled with the memory and operable to:
   receive information associated with a plurality of file operations;
   identify a first folder comprising a file associated with a first file operation of the plurality of file operations;
   increment a first file activity count associated with the first folder based on the first file operation, wherein the first file activity count represents a number of times that files in the first folder and in subfolders of the first folder have been accessed;
   increment a first user attribute count associated with the first folder based on the first file operation, wherein the first user attribute count represents a number of times that files in the first folder and in subfolders of the first folder have been accessed by a user that matches a particular user attribute;
   identify a second folder comprising the first folder; and
   increment a second file activity count associated with the second folder in response to the incrementing of the first file activity count, wherein the second file activity count represents a number of times that files in the second folder and in subfolders of the second folder have been accessed.

10. The system of claim 9, wherein the processing device is further operable to:

identify a third folder comprising a second file associated with a second file operation of the plurality of file operations, the second folder further comprises the third folder;

increment a third file activity count associated with the third folder based on the second file operation; and increment the second file activity count in response to the incrementing of the third folder activity count.

11. The system of claim 10, wherein the processing device is further operable to:

calculate an activity percentage for the first folder based on the first file activity count and the second file activity count and an activity percentage for the third folder based on the third file activity count and the second file activity count.

12. The system of claim 11, wherein the activity percentage for the first folder is based on the first file activity count and the second file activity count such that a value of the first file activity count is divided by a value of the second file activity count.

13. The system of claim 11, wherein the processing device is further operable to:

display the activity percentage for at least the first folder.

14. The system of claim 9, wherein the second folder is a root folder, and wherein the second file activity count is incremented for each of the plurality of file operations.

15. The system of claim 14, wherein the processing device is further operable to:

receive the particular user attribute, wherein the first file operation is associated with the user that matches the particular user attribute.

16. The system of claim 9, wherein the processing device is further operable to:

identify a third folder comprising a second file associated with a second file operation of the plurality of file operations, the first folder comprises the third folder;

increment a third file activity count associated with the third folder based on the second file operation; and increment the first and second file activity counts in response to the incrementing of the third file activity count.

17. A non-transitory computer readable storage medium including instructions that, when executed by a processing device, cause the processing device to perform operations comprising:

receiving information associated with a plurality of file operations;

identifying a first folder comprising a file associated with a first file operation of the plurality of file operations;

incrementing a first file activity count associated with the first folder based on the first file operation, wherein the first file activity count represents a number of times that files in the first folder and in subfolders of the first folder have been accessed;

incrementing a first user attribute count associated with the first folder based on the first file operation, wherein the first user attribute count represents a number of times that files in the first folder and in subfolders of the first folder have been accessed by a user that matches a particular user attribute;

identifying a second folder comprising the first folder; and incrementing a second file activity count associated with the second folder in response to the incrementing of the first file activity count, wherein the second file activity count represents a number of times that files in the second folder and in subfolders of the second folder have been accessed.

18. The non-transitory computer readable storage medium of claim 17, wherein the operations further comprise:

identifying a third folder comprising a second file associated with a second file operation of the plurality of file operations, the second folder further comprises the third folder;

incrementing a third file activity count associated with the third folder based on the second file operation; and incrementing the second file activity count in response to the incrementing of the third file activity count.

19. The non-transitory computer readable storage medium of claim 18, wherein the operations further comprise:

calculating an activity percentage for the first folder based on the first file activity count and the second file activity count and an activity percentage for the third folder based on the third file activity count and the second file activity count.

20. The non-transitory computer readable storage medium of claim 19, wherein the activity percentage for the first folder is based on the first file activity count and the second file activity count such that a value of the first file activity count is divided by a value of the second file activity count.

21. The non-transitory computer readable storage medium of claim 19, wherein the operations further comprise:

displaying the activity percentage for at least the first folder.

22. The non-transitory computer readable storage medium of claim 17, wherein the operations further comprise:

receiving the particular user attribute, wherein the first file operation is associated with the user that matches the particular user attribute.

23. The non-transitory computer readable storage medium of claim 17, wherein the operations further comprise:

identifying a third folder comprising a second file associated with a second file operation of the plurality of file operations, the first folder comprises the third folder;

incrementing a third file activity count associated with the third folder based on the second file operation; and incrementing the first and second file activity counts in response to the incrementing of the third file activity count.

* * * * *